United States Patent
Jardim

[19]

[11] Patent Number: 5,678,254
[45] Date of Patent: Oct. 21, 1997

[54] BORDER PROTECTOR DEVICE

[76] Inventor: Ricardo Strausz Jardim, Rua Carlos Honorio, 104, Sao Paulo—SP, Brazil, 05372-070

[21] Appl. No.: 284,631
[22] PCT Filed: Dec. 15, 1993
[86] PCT No.: PCT/BR93/00045
  § 371 Date: May 23, 1995
  § 102(e) Date: May 23, 1995
[87] PCT Pub. No.: WO94/13577
  PCT Pub. Date: Jun. 23, 1994

[30] Foreign Application Priority Data

Dec. 15, 1992 [BR] Brazil ............... 7202019 U

[51] Int. Cl.⁶ ............................................. E04H 4/00
[52] U.S. Cl. ....................................... 4/504; 5/663
[58] Field of Search ............... 4/496, 503, 504, 4/506; 5/663, 922; 297/391, 403; 248/345.1

[56] References Cited

U.S. PATENT DOCUMENTS

| | | | |
|---|---|---|---|
| 3,271,787 | 9/1966 | Clary | 4/172 |
| 3,889,303 | 6/1975 | Kinzel | 4/499 |
| 4,003,180 | 1/1977 | Messuri | 248/345.1 X |
| 4,201,359 | 5/1980 | Baslow | 248/345.1 X |
| 4,240,225 | 12/1980 | Sartain | 248/345.1 X |
| 4,514,871 | 5/1985 | Fisher et al. | 248/345.1 X |
| 4,920,896 | 5/1990 | Holden | 248/345.1 X |
| 5,134,730 | 8/1992 | Vandis | 4/504 |
| 5,423,093 | 6/1995 | Hall-Vandis | 4/496 X |

FOREIGN PATENT DOCUMENTS 2048223 3/1972 Germany ............... 248/345.1

*Primary Examiner*—Charles E. Phillips
*Attorney, Agent, or Firm*—Rudnick & Wolfe

[57] ABSTRACT

Border protector device applicable to the border (1) of pools, boats, and vehicle buckets and the like (2) is comprised of cushioned modules (3) provided with back end belts (4) for fixing in books (5) provided on the border (1), and the front sides (6) of the aforesaid cushioned modules (3) can define spaces as outlets for advertising (7); a second construction possibility of the cushioned module (3) shown by the reference (3') is possible.

1 Claim, 4 Drawing Sheets

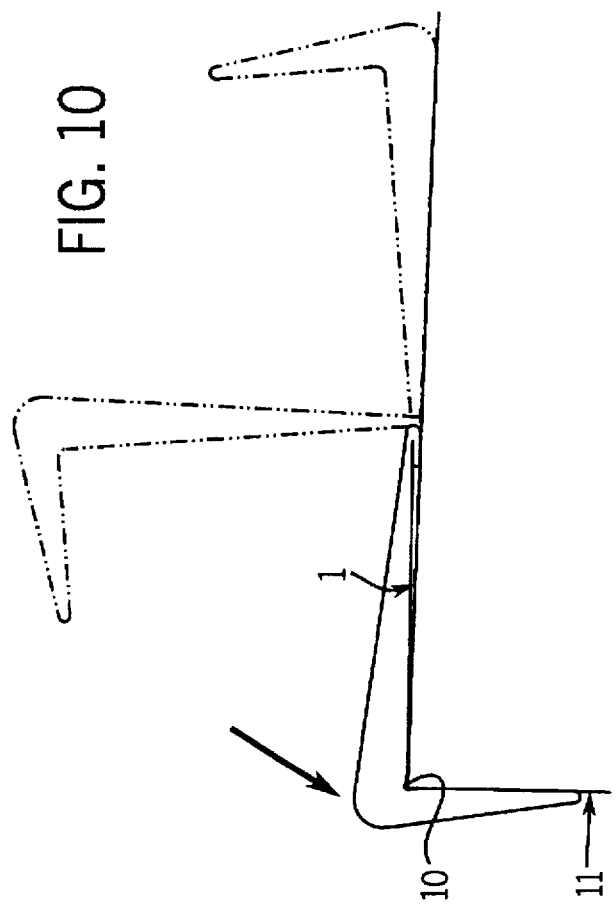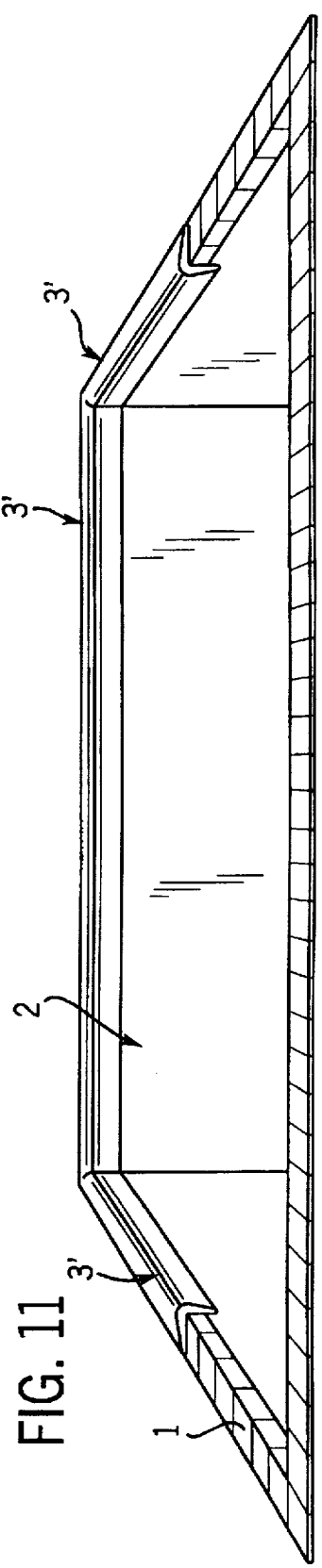

BORDER PROTECTOR DEVICE

The present patent relates to a border protector device belonging to a field of safety equipment that was developed for increasing the safety of the contiguous areas in: pools, bath tubes, boats, vehicle buckets and carts and the like.

The most frequent accidents around pools are falls due to wet grounds and total lack of attention of those who transit in these places. In general, these accidents are not very serious, but not rarely, they result in impacts on the edge of the pool, which could result in very serious injuries.

Another very common accident, also in pools, consists of that in which the user hits head or other parts of his boby on the border when jumping in the water, when the user slips, or even when de is in the pool, particularly playing.

Despite this, no equipment exists that avoids or minimizes more serious developments in these kinds of accidents.

Having in mind the problems given above and with the aim of solving them, the border protector device was developed, subject to the present invention, which is comprised substantially of cushioned modules that are mounted on the border of the pool.

This form of making the protector device avoids the occurrence of injuries when in a pool a pool user falls and/or when he jumps in and hits parts of his body on the border and/or other circumstances.

Another feature of the present device deals with the fact of providing an outlet for advertisements in public pools such as: of clubs, swimming schools, sports centers, hydrotherapy centers and the like.

The annexed drawings show a model of the border protector device, subject to the present patent, in which:

FIG. 10 shows schematicly the motion of the device shown in FIGS. 7, 8 and 9, related to the swimming-pool border, i.e. from a non-use position shown by the dotted lines up to the effective use position which is shown by a steady line;

FIG. 11 shows a swimming-pool partially fitted with the device according to the second construction possibility shown from FIG. 7 onwards.

Figure 1:
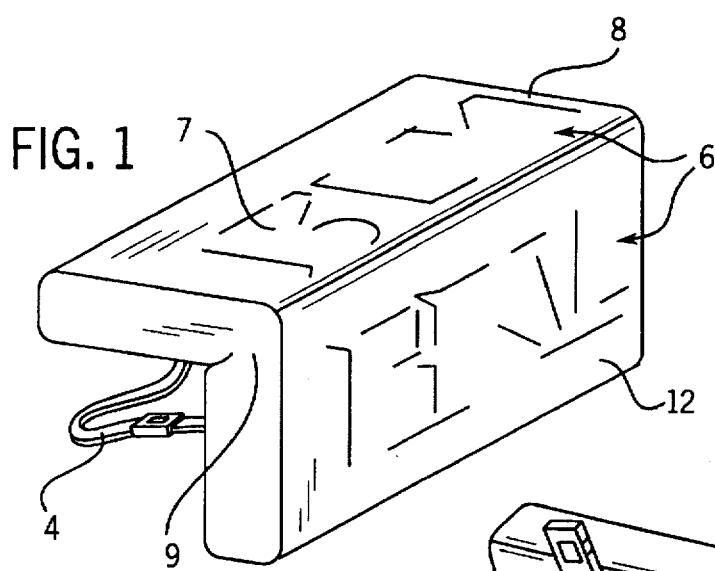
FIG. 1 shows a construction model of the device taken separately in perspective from the front side.
Figure 2:
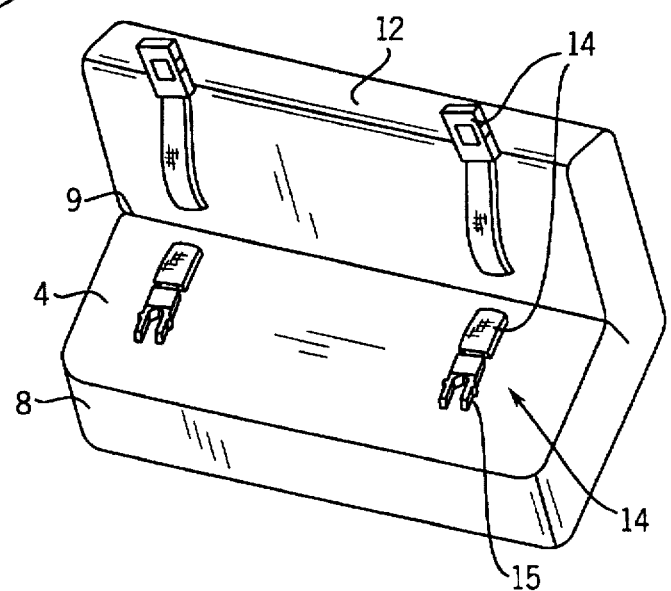
FIG. 2 shows a model seen from the back side of the setting.
Figure 3:
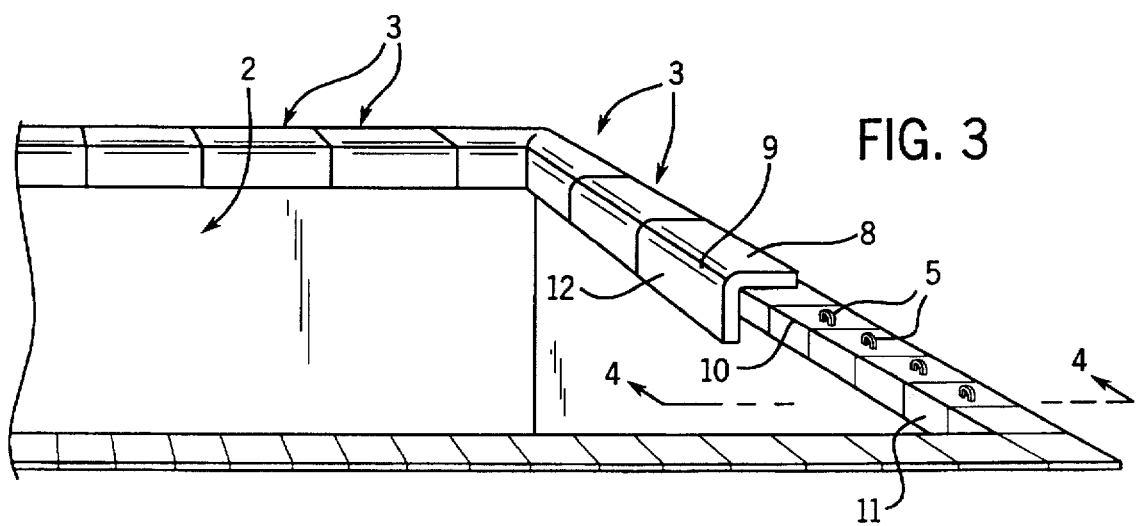
FIG. 3 shows a detail of a pool with the protector device mounted on it.
Figure 4:
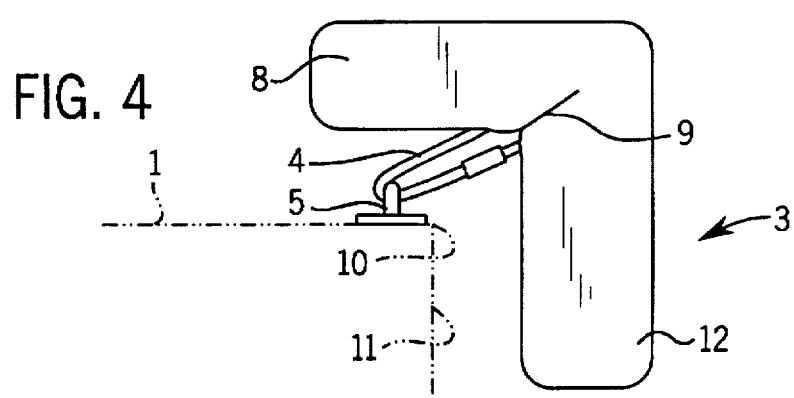
FIG. 4 shows an A—A section indicated in the previous figure.

In accordance with what the figures listed above illustrate, the model of the border protector device, subject to the present invention, preferably is applied to the border (1) of the pools (2) (FIG. 3) and comprises the cushioned modules (3) provided with back end belts (4) for fixing in hooks (5) provided on the border (1) of the pool, and the front sides (6) of the aforesaid cushioned modules (3) can define spaces for placing advertisements (7).

In one construction possibility, as shown in FIGS. 1 to 4, each cushioned module (3) has an "L" section defined by: a horizontally positioned section (8) that covers the border (1) of the pool (2); a vertex area (9) that covers the edge (10) between the border (1) and the upper region (11) of the pool wall (2) and a vertically positioned section (12) that covers the aforesaid upper region (11) of the pool wall.

Figure 5:
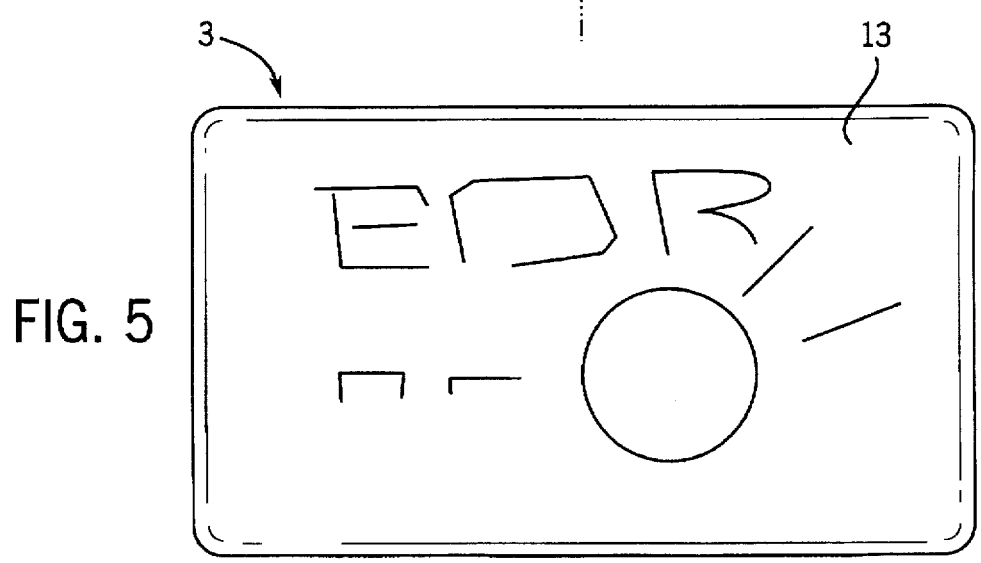
FIG. 5 shows another construction possibility of the device seen from the front side.
Figure 6:
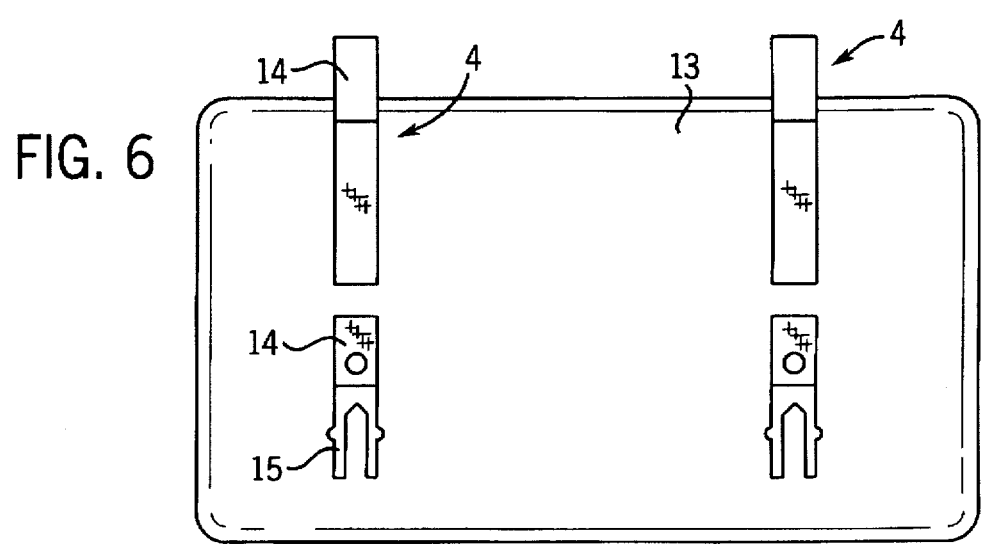
FIG. 6 shows the aforesaid device seen from the back side.
Figure 7:
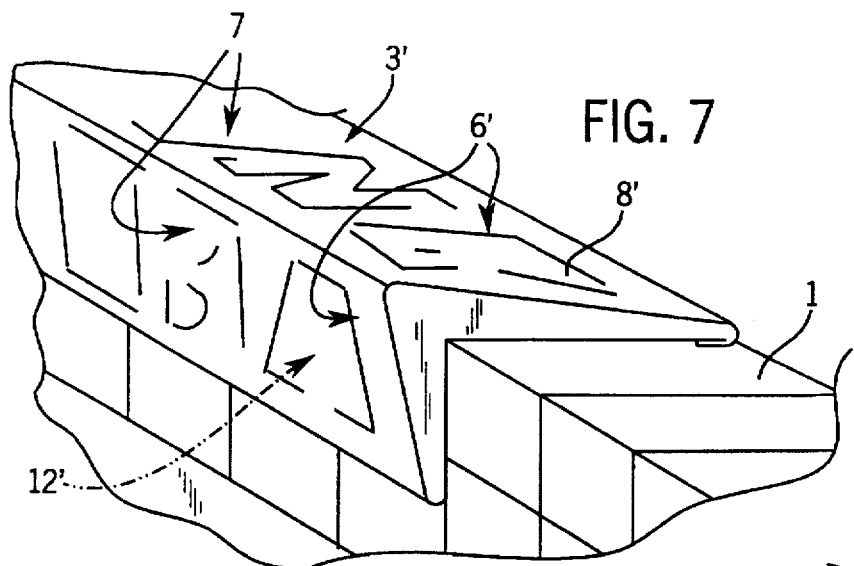
FIG. 7 shows another construction possibility of the aforesaid device which is in perspective.

In another possibility of embodiment, as in FIGS. 5 and 6, the cushioned module (3) is comprised of a rectangular prismatic body (13) that covers the border (1) of the pool.

The back side of the cushioned modules (3) can have 2 lashing belts (4), each one comprised by two parts (14) that go through the corresponding hook (05) and are interconnected by a buckle (15) provided on one of the parts of the belt (4).

In accordance with what the FIGS. 7 through 11 illustrated, the cushioned modules (3) may have another construction possibility which is shown by the reference (3'), thus the cushioned module (3') is equally set as to protect the border (1) of a swimming-pool (2); this feature is illustrated in more details in FIG. 11.

The cushioned module (3') comprises the front sides (6') where spaces for placing advertisements (7') are defined, and each cushioned module (3') has an "L" section defined by a horizontally positioned section (8'), that covers the border (1) of the swimming-pool (2); vertex area (9') which covers the edge (10) between the border (1) and the upper region (11) of the swimming-pool wall (2) and a vertically positioned section (12') that covers the aforesaid upper region (11) of the swimming-pool wall.

Figure 8:
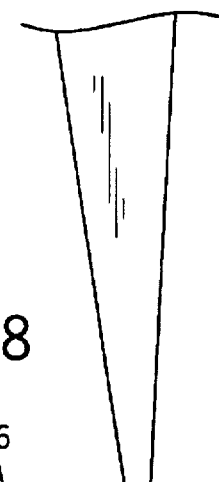
FIG. 8 shows the lower end of the device shown in FIG. 7 and gives an example of the way the device is fixed to the border of a swimming-pool.
Figure 9:
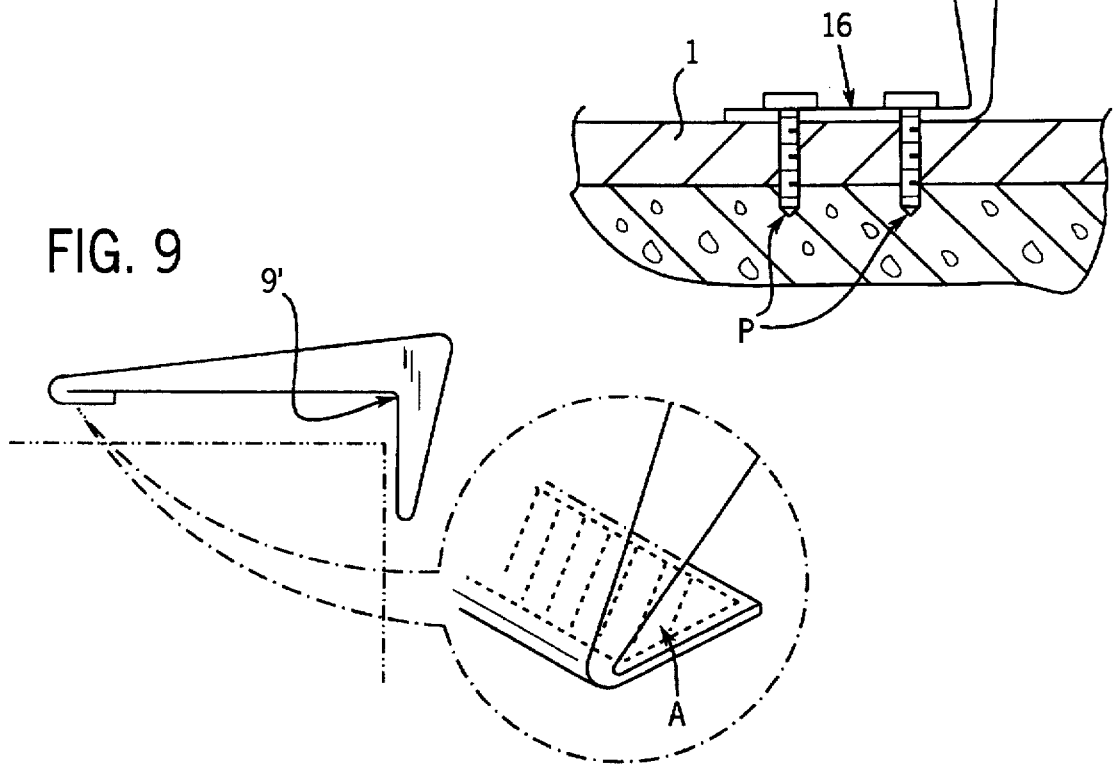
FIG. 9 shows another view of the lower end of the device as shown in FIGS. 7 and 8.

In the second construction possibility shown in FIGS. 7 through 11, the cushioned module (3') is provided with a flap (16) located alongside its lower section and faces toward the border (1) of the swimming-pool (2); the flap (16) is fixed by means of bolts (P) as shown on FIG. 8; the flap (16) may also be fixed by using an adhesive compound applied on the area (A) as shown in FIG. 9.

The construction described in the previous paragraph enables an installation which makes the sellective positioning of the cushioned module (3') easier, both in the use position, which is illustrated by a steady line in FIGS. 8 and 10, and in the non-use position, represented by a dotted line (FIG. 10)

The cushioned modules (3 and 3') may have any kind of construction which suits better the circumstances of use, for instance, to consist of an outer casing and flexible material fillers; the cushioned modules (3 and 3') can be made of foam.

Logically, the protector device, instead of being used in pools as alluded to above, can be used in bath tubs, boats, vehicle bucket and cart protectors and the like. In these case, optionally, instead of the cushioned module having a conception as described and shown above, the aforesaid module can be on-piece and sufficient for covering, for example, the entire sides of a pool or boats, vehicle buckets and carts and the like.

I claim:

1. A border protector apparatus for overlying a border of a swimming pool, boat, vehicle cart and the like, wherein said border has an angled cross-sectional configuration, said border protector apparatus comprising:

a cushioned module having a cross-sectional configuration that compliments, extends over, and protects a portion of said border, said cushioned module having inner and outer surfaces, with said outer surface of said module having spaces for accommodating advertisements, and an apparatus for holding said cushioned module in relation relative to said border such that said module is permitted to move within predetermined limits relative to said border while retaining said cushioned module in secured relation relative to said border, said holding apparatus including a foldable member flexibly connected to and extending from a free edge of the cushioned module such that the member is foldable beneath a major portion of the cushioned module such that fastener structure, arranged in operable combination with the foldable member and used to fixedly hold the cushioned module in relation to said border, is protected by the cushioned module extending thereover, and wherein the fastener structure includes a pair of fasteners extending through the flexible member, with each fastener including a shank portion for threadably securing the flexible member to the border.

* * * * *